United States Patent
Fan et al.

(10) Patent No.: US 11,933,934 B2
(45) Date of Patent: Mar. 19, 2024

(54) SECURITY INSPECTION DEVICE AND TRANSFER METHOD THEREFOR

(71) Applicants: NUCTECH COMPANY LIMITED, Beijing (CN); NUCTECH (BEIJING) COMPANY LIMITED, Beijing (CN); TSINGHUA UNIVERSITY, Beijing (CN)

(72) Inventors: Xuping Fan, Beijing (CN); Quanwei Song, Beijing (CN); Yu Hu, Beijing (CN); Shangmin Sun, Beijing (CN)

(73) Assignees: NUCTECH COMPANY LIMITED, Beijing (CN); NUCTECH (BEIJING) COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 337 days.

(21) Appl. No.: 17/420,678

(22) PCT Filed: Jan. 3, 2020

(86) PCT No.: PCT/CN2020/070302
§ 371 (c)(1),
(2) Date: Jul. 4, 2021

(87) PCT Pub. No.: WO2020/140977
PCT Pub. Date: Jul. 9, 2020

(65) Prior Publication Data
US 2022/0099857 A1 Mar. 31, 2022

(30) Foreign Application Priority Data
Jan. 4, 2019 (CN) .......................... 201910009509.5

(51) Int. Cl.
*G01N 23/10* (2018.01)
*G01N 23/04* (2018.01)
*G01V 5/00* (2006.01)

(52) U.S. Cl.
CPC .......... *G01V 5/0016* (2013.01); *G01N 23/04* (2013.01); *G01N 23/10* (2013.01);
(Continued)

(58) Field of Classification Search
CPC ...... G01V 5/0016; G01N 23/04; G01N 23/10; G01N 2223/301; G01N 2223/308; G01N 2223/639
See application file for complete search history.

(56) References Cited

U.S. PATENT DOCUMENTS 7,769,133 B2 * 8/2010 Carver ................ G01V 5/0016
378/197
2007/0217572 A1 * 9/2007 Kotowski ............ G01V 5/0008
378/57
(Continued)

FOREIGN PATENT DOCUMENTS

CN 1197209 A 10/1998
CN 101271075 A 9/2008
(Continued)

OTHER PUBLICATIONS

International Search Report of PCT No. PCT/CN2020/070302.
(Continued)

*Primary Examiner* — David P Porta
*Assistant Examiner* — Mamadou Faye

(57) ABSTRACT

The present disclosure relates to a security inspection device and a transfer method, and the security inspection device includes an arm frame, provided with detectors, and configured to form an inspection channel; a first compartment, internally provided with a radiation source and connected
(Continued)

with the arm frame, a protection wall, connected with the first compartment or the arm frame, and configured to perform radiation protection for an object to be protected, and a tire assembly, configured to enable the security inspection device to move relative to the ground, and the arm frame, the first compartment, the protection wall and the tire assembly are set to be transported together in a connected state.

19 Claims, 2 Drawing Sheets

(52) U.S. Cl.
CPC . *G01N 2223/301* (2013.01); *G01N 2223/308* (2013.01); *G01N 2223/639* (2013.01)

(56) References Cited

U.S. PATENT DOCUMENTS

| | | | |
|---|---|---|---|
| 2008/0197279 A1* | 8/2008 | Kang | B66F 7/08 |
| | | | 250/306 |
| 2013/0177134 A1 | 7/2013 | Tay | |
| 2015/0204999 A1* | 7/2015 | Sun | G01V 5/0016 |
| | | | 378/57 |
| 2016/0325586 A1* | 11/2016 | Mathieson | B60B 29/002 |
| 2019/0008710 A1* | 1/2019 | Wilson | A61G 7/1051 |

FOREIGN PATENT DOCUMENTS

| | | |
|---|---|---|
| CN | 104991282 A | 10/2015 |
| CN | 105379425 A | 3/2016 |
| CN | 205480850 U | 8/2016 |
| CN | 106218482 A | 12/2016 |
| CN | 106229022 A | 12/2016 |
| CN | 206074829 U | 4/2017 |
| CN | 206116029 U | 4/2017 |
| CN | 106645225 A | 5/2017 |
| CN | 107765320 A | 3/2018 |
| CN | 107860782 A | 3/2018 |
| CN | 207396382 U | 5/2018 |
| CN | 207895080 U | 9/2018 |
| CN | 109490977 A | 3/2019 |
| CN | 109521484 A | 3/2019 |
| CN | 109521485 A | 3/2019 |
| CN | 209327591 U | 8/2019 |
| DE | 202009015830 U1 | 3/2010 |
| EP | 3346300 A1 | 7/2018 |
| GB | 2594201 A | 10/2021 |
| JP | 4420188 B2 | 2/2010 |
| WO | 2018041143 A1 | 3/2018 |

OTHER PUBLICATIONS

The first Office Action dated Jun. 8, 2023 of CN Application No. 201910009509.5.
Examination Report dated May 20, 2022 under Section 18(3) of UK Application No. GB2109371.1.
The second Office Action received in the counterpart Chinese application 201910009509.5, dated Dec. 27, 2023, 5 pages.

* cited by examiner

SECURITY INSPECTION DEVICE AND TRANSFER METHOD THEREFOR

CROSS-REFERENCES TO RELATED APPLICATIONS

The present disclosure is a national phase application of International Application No. PCT/CN2020/070302, filed on Jan. 3, 2020, which claims the priority of Chinese application No. 201910009509.5, filed on Jan. 4, 2019, the entireties of which are herein incorporated by reference.

FIELD

The present disclosure relates to the field of scanning inspection, in particular to a security inspection device and a transfer method therefor.

BACKGROUND

Security inspection devices are devices installed at ports, customs and civil airports to inspect containers or moving vehicles, etc. The security inspection device uses the principle of radiation imaging to scan an object to be protected passing through it, in order to obtain a perspective image of the to-be-inspected object, and realizing scanning inspection.

According to the requirements of use, the security inspection devices sometimes need to be transported to different places to perform inspection tasks. Especially for some relatively large security inspection devices, due to the larger size, the transfer is relatively difficult, the road transport height requirements may not be met in the transport process, and due to the restrictions of size of the transport equipment, various parts of the security inspection device generally need to be disassembled during transportation, such as the arm frame, the compartment, the detector and the radiation source, and then the various parts of the security inspection device are reinstalled and commissioned at the operating site.

SUMMARY

According to one embodiment of the present disclosure, a security inspection device is provided, including:
- an arm frame, provided with detectors, and configured to form an inspection channel;
- a first compartment, internally provided with a radiation source and connected with the arm frame;
- a protection wall, connected with the first compartment or the arm frame, and configured to perform radiation protection for an object to be protected; and
- a tire assembly, configured to enable the security inspection device to move relative to the ground;
- and the arm frame, the first compartment, the protection wall and the tire assembly are set to be transported together in a connected state.

In some embodiments, the tire assembly is rotatably arranged around a vertical axis.

In some embodiments, in an extension direction of the inspection channel, the tire assembly goes beyond the outer side of the first compartment in a working state of the security inspection device.

In some embodiments, the tire assembly is configured to rotate to an outer side of the first compartment in a horizontal plane vertical to the extension direction of the inspection channel in a transport state of the security inspection device.

In some embodiments, the tire assembly includes:
- a bracket, rotatably arranged at the bottom of the first compartment; and
- a tire, mounted on the bracket;
- and the tire assembly is configured to rotate to a location at which an axis of the tire is vertical to an extension direction of the inspection channel in a working state of the security inspection device, and rotate to a location at which the axis of the tire is consistent with the extension direction of the inspection channel in a transport state of the security inspection device.

In some embodiments, an outer side of the bottom of the first compartment is provided with an accommodating groove, the tire assembly is arranged in the accommodating groove, and the rotate axis of rotation is set close to an inner side of the accommodating groove in a horizontal plane vertical to an extension direction of the inspection channel, and the tire assembly is set to rotate outwards in the horizontal plane vertical to the extension direction of the inspection channel in a transport state of the security inspection device.

In some embodiments, the security inspection device further includes a controller and a drive member, and the controller is configured to enable the drive member to drive the tire assembly to rotate.

In some embodiments, in an extension direction of the inspection channel, the relative position between the arm frame and the first compartment remains unchanged in a transport state and a working state of the security inspection device.

In some embodiments, the protection wall is arranged retractably relative to the arm frame, and to be unfolded in a working state of the security inspection device to perform radiation protection on the object to be protected, and be retracted in a transport state of the security inspection device to shorten the length of the protection wall in an extension direction of the inspection channel.

In some embodiments, in the extension direction of the inspection channel, the protection wall does not go beyond the side of the first compartment in the retracted state.

In some embodiments, the protection wall is rotatably arranged in a horizontal plane, and is retracted inwards in the transport state of the security inspection device.

In some embodiments, the security inspection device includes two groups of protection walls, two groups of the protection walls are respectively arranged on two sides of the arm frame in the extension direction of the inspection channel, and each group of protection walls includes two protection walls arranged in parallel, which are configured to be folded towards a midline of the inspection channel to achieve retraction.

In some embodiments, in an extension direction of the inspection channel, a height of the protection wall gradually decreases in a direction away from the arm frame.

In some embodiments, the arm frame is set in a height direction in a liftable manner, and is configured to be raised in a working state of the security inspection device to form the inspection channel, and is configured to be lowered in a transport state of the security inspection device for retraction.

In some embodiments, the arm frame is configured to be retracted in the transport state of the security inspection device to a height not exceeding the height of the first compartment or a maximum restricted height for road travel.

In some embodiments, the security inspection device further includes a second compartment, and the arm frame is of a portal structure and includes a horizontal arm and two vertical arms, the top ends of the two vertical arms are respectively connected with two ends of the horizontal arm respectively, and the bottom ends of the two vertical arms are respectively connected with the first compartment and the second compartment.

In some embodiments, the arm frame is adjustable in length in a horizontal plane in a direction vertical to an extension direction of the inspection channel.

According to another embodiment of the present disclosure, a transfer method based on the security inspection device of the above embodiments is provided, including:

in a state when the arm frame is connected with the first compartment, the protection wall is connected with the first compartment or the arm frame, and the tire assembly is not removed, transporting the arm frame, the first compartment, the protection wall and the tire assembly together to achieve transfer.

In some embodiments, the transfer method further including:

rotating the tire assembly to an outer part of the first compartment in a horizontal plane vertical to an extension direction of the inspection channel before transporting.

In some embodiments, the transfer method further including:

retracting the protection wall to shorten the length of the protection wall in an extension direction of the inspection channel before transporting.

In some embodiments, the transfer method further including:

lowering the arm frame to a height not exceeding the height of the first compartment or a maximum restricted height for road travel before transporting.

BRIEF DESCRIPTION OF THE DRAWINGS

The accompanying drawings illustrated herein are used to provide a further understanding of the present disclosure and constitute a part of the present application, and the schematic embodiments of the present disclosure and their descriptions are used to explain the present disclosure and do not constitute an improper limitation of the present disclosure. In the accompanying drawings.

Figure 1:
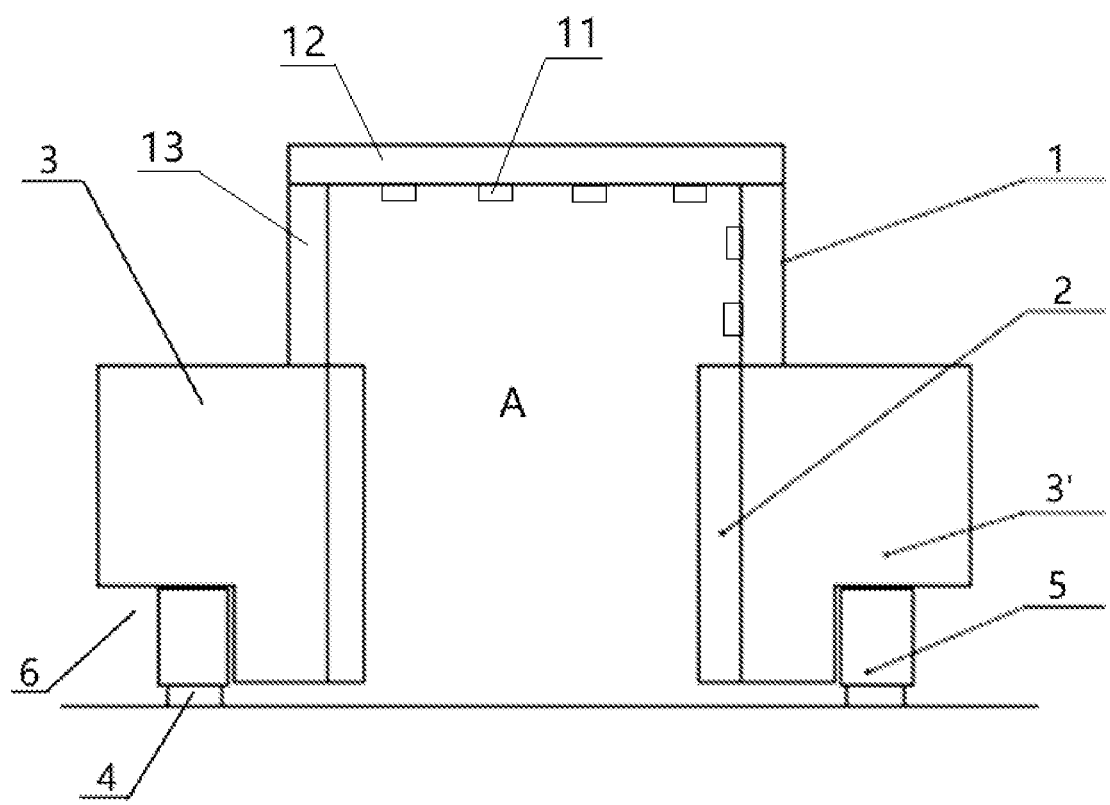
FIG. 1 is a front view of some embodiments of a security inspection device of the present disclosure in a working state.

REFERENCE NUMERALS 1, arm frame; 11, detector; 12, horizontal arm; 13, vertical arm; 2, protection wall; 3, first compartment; 3', second compartment; 4, tire; 5, bracket; 6, accommodating groove.

DETAILED DESCRIPTION OF THE DISCLOSURE

The present disclosure is described in detail below. In the following paragraphs, different aspects of the embodiments are defined in greater details. The aspects so limited may be combined with any other aspect or aspects, unless it is expressly stated that they cannot be combinable.

The terms "first" and "second" appearing in the present disclosure are merely to facilitate description, to distinguish different constituent parts with the same name, and do not indicate a sequential or primary relationship.

In the description of the present disclosure, the orientation or positional relationship indicated by such terms as "up", "down", "top", "bottom", "front", "rear", "inner" and "outer" is the orientation or positional relationship based on the accompanying drawings. Such terms are merely for the convenience of description of the present disclosure, rather than indicating or implying that the device or element referred to must be located in an orientation or must be constructed or operated in an orientation, therefore, the terms cannot be understood as a limitation to the protection scope of the present disclosure.

In the related technology known by the inventor, for large security inspection devices, when transported, various parts of the security inspection device should be disassembled, such as the arm frame, the compartment, the detector, the radiation source, etc., and then such parts are reinstalled and commissioned at the operating site. Moreover, a protection wall needs to be reconstructed and the civil construction work of the protection wall needs to be conducted at the site, and consuming a long time and requiring a large investment in manpower. Therefore, the operation of the security inspection device is more cumbersome when the security inspection device needs to be transferred, and the detection precision of the security inspection device cannot be easily ensured under the influence of repeated installation for many times.

In view of this, the present disclosure provides a security inspection device and a transfer method that can improve the convenience of the security inspection device when the security inspection device needs to be transferred to a different site for use.

The security inspection device of some embodiments of the present disclosure is equipped with tire assemblies that allow the security inspection device to be moved flexibly on the ground as a whole. By setting the arm frame, the first compartment, the protection wall and the tire assembly to be transported together in a connected state, when the security inspection device needs to be transferred to a site, all the parts do not need to be disassembled, the entire security inspection device can be transported as a whole, and the reinstallation and commissioning of the tire assembly at the inspection site are eliminated, and shortening the disassembly time and improving the transfer efficiency. In addition, reconstruction of the protection wall and civil construction work of the protection wall at the inspection site can also be avoided, so that the security inspection device can be put into operation soon after being transported to the inspection site. These embodiments can greatly shorten the time spent on security inspection devices from transportation to operation, improve the efficiency of the transfer, improve the convenience of use, and reduce labor input.

As shown in FIG. 1 to FIG. 4, the present disclosure provides a security inspection device, in some embodiments, the security inspection device includes: an arm frame 1, a first compartment 3, a protection wall 2, and a tire assembly. In one embodiment, the arm frame 1 is provided with detectors 11, and the arm frame 1 is set to be, for example, of an L shape or a portal shape, etc., to form an inspection channel A. The first compartment 3 is internally provided with a radiation source and is connected with the arm frame 1. The protection wall 2 is connected with the first compartment 3 or the arm frame 1, to perform radiation protection on the object to be protected. Tire assemblies can be arranged at the bottom of the security inspection device, and are configured to drive the security inspection device to move relative to the ground as a whole. For example, two tire assemblies can be arranged respectively in the positions close to two sides along an extension direction of the inspection channel A of the first compartment 3.

When scanning inspection is needed, a to-be-inspected object moves relatively relative to the arm frame along the length direction of the inspection channel A, the rays emitted by the radiation source penetrate through the to-be-inspected object and is received by the detector 11, through an analysis of the information received by the detector 11, whether the to-be-inspected object meets the security standards can be determined.

Since the security inspection device is equipped with the tire assembly, the security inspection device can move flexibly within the site without the need for civil construction like fixed or track type security inspection devices, and the movement of the security inspection device can be smoother and steadier, turning can be realized and motion trajectory can be selected freely.

In the site of a preset range, if the objects to be inspected in different areas need to be inspected, the security inspection device can be enabled to move sequentially to the areas where the objects to be inspected are placed, in order to inspect to-be-inspected objects in that area. Or the position of the security inspection device can be kept unchanged, and the to-be-inspected objects can be carried in various types of vehicles or conveyors to pass through the security inspection device in sequence. In the inspection process, the objects to be inspected and the arm frame 1 move relatively, the objects to be inspected can move alone, the arm frame 1 can move alone or the two can move simultaneously.

In one embodiment, the arm frame 1, the first compartment 3, the protection wall 2 and the tire assembly are configured to be transported together in the connected state. The connecting relationship between the arm frame 1, the first compartment 3 the protection wall 2 and the tire assembly are the same in a working state and in a transport state. Such a security inspection device has at least one of the following embodiments:

(1) When the security inspection device needs to be transferred, the key parts do not need to be disassembled, the tiers do not need to be removed, the entire security inspection device can be transported as a whole, and reinstallation and commissioning at the inspection site are eliminated, and shortening the disassembly time, improving the efficiency of the transfer, enhancing the convenience of use and reducing labor input.

(2) During transportation, the parts of the security inspection device are connected together and on the same transport equipment, no marking or matching is in need when multiple security inspection devices are involved in transportation (3) Re-construction of protection walls and civil construction of protection walls at the inspection site can be avoided, so that the security inspection device can be put into operation soon after being transported to the inspection site, and greatly shortening the time spent from transporting the security inspection device to putting into operation.

(4) The parts of the security inspection device are connected together for transportation, and no reinstallation and commissioning are required when the security inspection device is used in a new site, and ensuring the detection precision of the security inspection device.

In some embodiments, the tire assembly is rotatably arranged around a vertical axis. In the present embodiment, the tire assembly can rotate to a suitable angle position in the working state and the transport state of the security inspection device, to improve walking and support stability in the working state, and adapt the overall size to the needs of the transport equipment in the transport state, so that the security inspection device can be more flexible and convenient to achieve the transfer, and further the time spent in disassembling and installing tires is saved.

Figure 2:
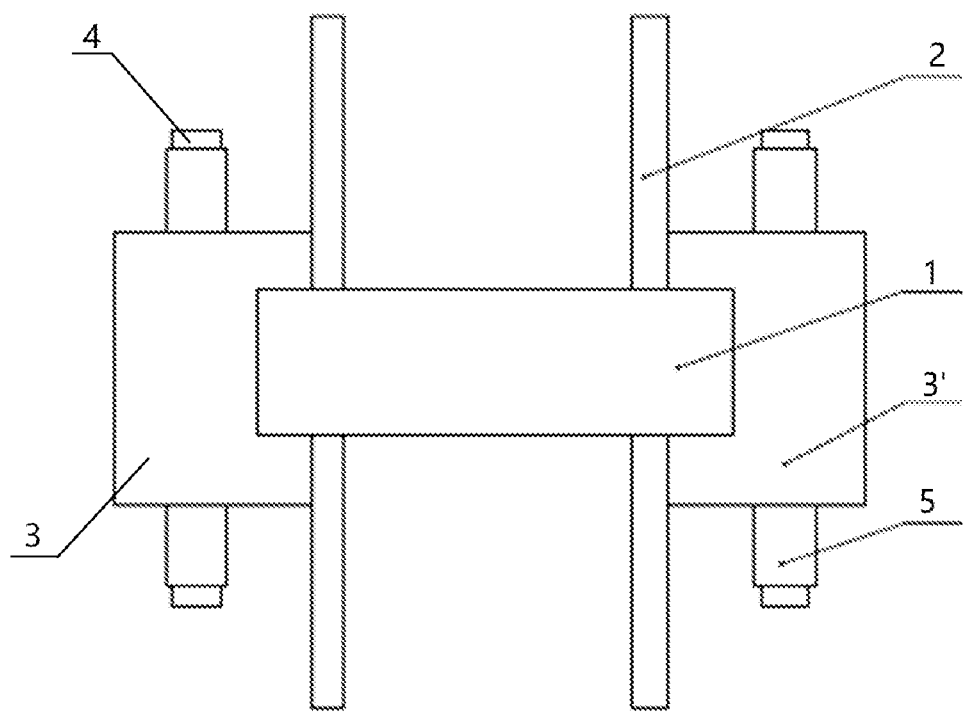
FIG. 2 is a top view of some embodiments of a security inspection device of the present disclosure in a working state.

In some embodiments, as shown in FIG. 2, the tire assembly goes beyond an outer side of the first compartment 3 in the working state of the security inspection device in the extension direction of the inspection channel A. In the present embodiment, the support spacing between the tire assemblies can be increased, to improve the stability of the security inspection device during operation and movement.

Figure 3:
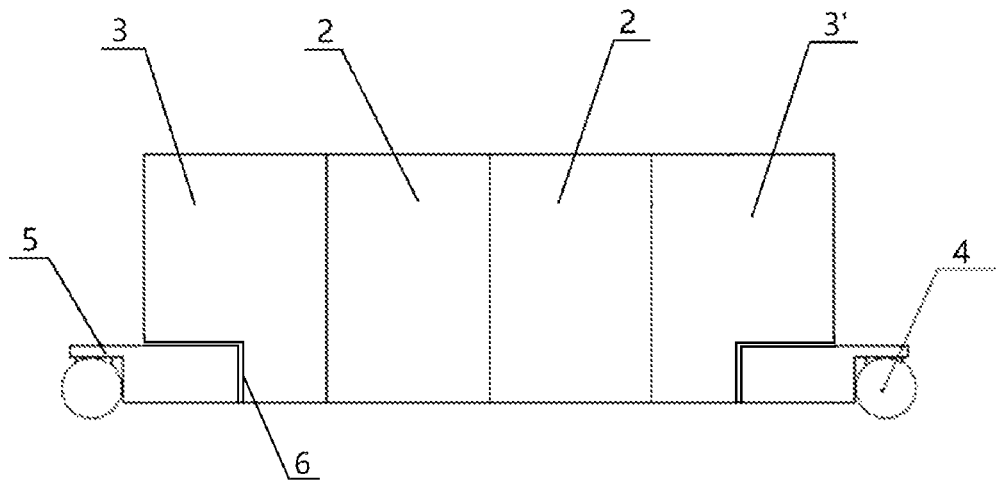
FIG. 3 is a front view of some embodiments of a security inspection device of the present disclosure in a transport state.
Figure 4:
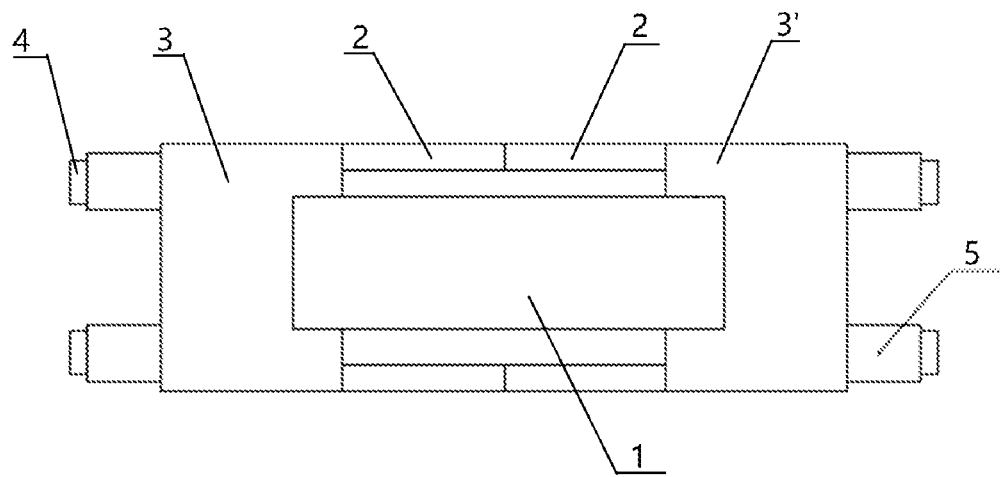
FIG. 4 is a top view of some embodiments of a security inspection device of the present disclosure in a transport state.

Based on such a setting structure of the tire assembly, as shown in FIG. 3 and FIG. 4, the tire assembly is configured to rotate to the outer side of the first compartment 3 in a direction vertical to the extension direction of the inspection channel A in the transport state of the security inspection device.

When the transport equipment is a transport vehicle, since the holding volume of the general transport vehicle compartment is generally limited by the width dimension, the tire assembly can be rotated to a position of the outer side vertical to extension direction of the inspection channel A, to reduce the requirement for the width of the transport vehicle. In addition, as to the structure, during transportation, although the tire assembly increases the size of the security inspection device in the direction vertical to the extension direction of the inspection channel A, which is equivalent to the need to occupy more space in the length of the transport vehicle, however, the stability of the security inspection device when transported can be improved.

If the tire assembly is set in a position that does not affect the transport dimensions during transport, the tire assembly can be left in its original position and the scanning assembly can be transported as a whole.

In some embodiments, as shown in FIG. 1 and FIG. 3, the tire assembly includes a bracket 5 and a tire 4. In one embodiment the bracket 5 is rotatably arranged at the bottom of the first compartment 3 and the tire 4 is mounted below the bracket 5. The tire 4 and the bracket 5 can rotate as a whole. The tire assembly is configured to rotate to a location at which an axis of the tire 4 is vertical to the extension direction of the inspection channel A in the working state of the security inspection device, please refer to FIG. 1, and the tire assembly is configured to rotate to a location at which the axis of the tire 4 is consistent to the extension direction of the inspection channel A in the transport state of the security inspection device, please refer to FIG. 3.

In the present embodiment, the movement of the security inspection device in the working state is facilitated and the tires 4 can be rotated to the outer side of the first compartment 3 in the direction vertical to the extension direction of the inspection channel A of the first compartment 3 in the transport state, and reducing the requirement for the width of the transport vehicle even though the sizes are increased in this direction, since the length of the transport vehicle can be easily selected according to the transport needs, while the width will be limited by the width of the road travel, moreover, the width is limited by the road travel width. In addition, in the transport state, the tire 4 can rotate to its axis in the same direction as the extension direction of the inspection channel A, and increasing the difficulty of moving the security inspection device in the width direction of the transport vehicle and improving the stability of the transportation.

In some embodiments, as shown in FIG. 1 and FIG. 3, an accommodating groove 6 is arranged at an outer side of the bottom of the first compartment 3, which is equivalent to, for a rectangular first compartment 3, removing part of the outer corner of the first compartment 3 to form the accommodating groove 6, for example, the accommodating groove 6 may be of a rectangular structure. The rotate axis of the tire assembly is set close to an inner side of the accommodating groove 6 in a horizontal plane vertical to an extension direction of the inspection channel, so that an inner side of the bracket 5 is also set to be close to the inner side wall of the accommodating groove 6, and the tire assembly is set to rotate outwards along the direction vertical to the extension direction of the inspection channel A in the transport state of the security inspection device.

In the present embodiment, the bracket 5 is set to be close to the inner side wall of the accommodating groove 6. In the transport state, if the tire assembly rotates to the outer side vertical to the extension direction of the inspection channel A of the first compartment 3, the outreaching length of the tire assembly can be minimized to reduce the overall size of the security inspection device. The present embodiment is particularly suitable for structures in which the tire assembly exceeds the size of the first compartment 3 along the extension direction of the inspection channel A by a large amount.

In some embodiments, the security inspection device further includes a controller and a drive member, and the controller is configured to enable the drive member to drive the tire assembly to rotate. In the present embodiment, the state of the tire assembly in the working state and the transport state of the security inspection device can be automatically controlled, making it faster and more convenient to use in transfer. In one embodiment, the rotation of the tire assembly can also be manually controlled.

In some embodiments, in the extension direction of the inspection channel A, the relative position between the arm frame 1 and the first compartment 3 remains unchanged in the transport state and the working state of the security inspection device. In the present embodiment, the relative position of the detector 11 arranged on the arm frame 1 and the radiation source arranged on the first compartment 3 can remain unchanged in the transport state and the working state, and saving the time needed to re-commission the relative position of the detector 11 and the radiation source at the inspection site, so that the security inspection device can be put into inspection work faster after it is unloaded from the transport equipment.

In some embodiments, as shown in FIG. 4, the protection wall 2 is retractably arranged relative to the arm frame 1, and to be unfolded in the working state of the security inspection device to perform radiation protection on the object to be protected, and be retracted in the transport state of the security inspection device to shorten the length of the protection wall 2 in the extension direction of the inspection channel A.

In the present embodiment, the protection wall 2 is not removed during transportation, and the protection wall 2 only needs to be retracted to reduce the space it occupies in the extension direction of the inspection channel A. When the security inspection device is placed on the transport equipment, the extension direction of the inspection channel A is consistent with the width direction of the transport equipment, and the direction vertical to the inspection channel A is the consistent with the length direction of the transport equipment. When the transport equipment is a transport vehicle, since the holding volume of the general transport vehicle compartment is generally limited by the width size, therefore, the retraction of the protection wall 2 can reduce the requirements on the width of the transport vehicle. In addition, the overall transport volume of the security inspection device can also be reduced, and being easy to transport and improving transport stability.

In the transport state, the protection wall 2 is arranged at least one of the position of inside the radiation detection device and abutting against the first compartment 3. When the inspected objects such as containers, vehicles are inspected, the protection wall 2 is unfolded to prevent leakage of rays, to improve the security in the radiation inspection, when the inspection is not required, such as during transfer transport or storage, the position of the protection wall 2 is changed to reduce the space occupied by the overall security inspection device, to facilitate the transportation of the security inspection device as a whole, moreover, the occupied area during storage is small. Since the security inspection device can be transported or stored as a whole, it is also conducive to reducing the installation and commissioning work when used again and facilitating the security inspection device to be ready for inspection quickly.

Please still refer to FIG. 4, in the extension direction of the inspection channel A, the protection wall 2 does not go beyond the side of the first compartment 3 in a retracted state. This structure minimizes the space occupied by the security inspection device in the width direction of the transport equipment.

In some embodiments, the protection wall 2 is rotatably arranged in a horizontal plane to be retracted inwards in the transport state of the security inspection device. For example, one end of the protection wall 2 is rotatably connected to the arm frame 1 or the first compartment 3, and the other end can rotate freely. Such a structure is easy to implement without taking up the internal space of other parts such as an arm frame 1.

In one embodiment, the protection wall 2 can also be designed in a multi-segment retractable manner, and can extend when radiation protection needs to be performed on the object to be protected, and can be retracted in the transport state.

In some embodiments, two groups of protection walls 2 are arranged, and the two groups of protection walls 2 are respectively arranged on two sides of the arm frame 1 along the extension direction of the inspection channel A. Each group of protection walls 2 includes two protection walls 2 which are arranged in parallel and configured to be retracted towards the midline of the inspection channel A to achieve retraction thereof. In the working state, each protection wall 2 can be unfolded to a state parallel to the extension direction of the inspection channel A.

As shown in FIG. 1, the arm frame 1 is of a portal structure, and the arm frame 1 includes two vertical arms 13 and a horizontal arm 12 connected to the top ends of the two vertical arms 13, and the inspection channel A is formed between the two vertical arms 13, as shown in FIG. 2, and the above "extension direction of the inspection channel A" is a direction vertical to a plane in which the arm frame 1 is located. The "midline of inspection channel A" is the midline position which is parallel to the extension direction of the inspection channel A and located between the two vertical arms 13.

The protection wall 2 of this security inspection device forms a symmetrical structure, which provides better protection effect and also reduces the space occupied by the protection wall 2 when it is unfolded, and facilitating transportation.

In one embodiment, the protection wall 2 includes a first protection section, a second protection section and a connection member, and the first protection section and the second protection section are movably connected through the connection member, and the second protection section can be folded towards the midline of the inspection channel A relative to the first protection section.

In some embodiments, as shown in FIG. 2 and FIG. 4, in the extension direction of the inspection channel A, the first protection section is arranged between the front and rear sides of the first compartment 3, and the second protection section is arranged at least partially beyond the front or rear sides of the first compartment 3, and the folded second protection section is arranged between the front and rear sides of the first compartment 3.

This structure allows the protection wall 2 to be folded all the way into the space between the front side and the rear side of the first compartment 3 after the protection wall 2 is folded, so that the width of the entire security inspection device in the front and rear directions is approximately equal to the width of the first compartment 3, and minimizing the width of the entire security inspection device and facilitating transportation.

In designing the protection wall 2, two times a length of the second protection segment is equal to or greater than the lateral distance between the two vertical arms 13 of the arm frame 1. When two times the length of the second protection segment is equal to the lateral distance between the two vertical arms 13 of the arm frame 1, the second protection segments on the left and right sides are folded inwards respectively to close the inspection channel A like two doors; when two times the length of the second protection segment is greater than the lateral distance between the two vertical arms 13 of the arm frame 1, the second protection segments on the left and right sides are overlapped with each other in the front and rear after they are folded inwards respectively, and achieving the purpose of reducing the width from the front to the rear of the security inspection device by folding, but also having a large range of radiation protection.

In some embodiments, in the extension direction of the inspection channel A, a height of the cross section of the protection wall 2 decreases gradually in a direction away from the arm frame 1. Such a setting can minimize the volume of the protection wall 2 and reduce the overall weight of the security inspection device while achieving as much comprehensive protection as possible.

In some embodiments, the security inspection device further includes a locking structure, and the locking structure is configured to hold together two protection walls 2 that are on one side of the first compartment 3, or to hold each protection wall 2 together with the first compartment 3 or the second compartment 3' mentioned subsequently. The first locking structure uses, for example, a snap structure, a pin structure, ropes, chains, etc.

In some embodiments, the arm frame 1 is arranged in a liftable manner in a height direction, and is configured to be raised to form an inspection channel A in the operating state of the security inspection device and lowered for retraction in the transport state of the security inspection device.

For example, the arm frame 1 is of a portal structure and includes a horizontal arm 12 and two vertical arms 13 connected on both sides of the horizontal arm 12 respectively, and the two vertical arms 13 are set to achieve stretching in a way of nesting of a multi-stage box structure; or a guide rail structure is used to achieve stretching. By using the stretching structure, the height of the security inspection device in the transportation process is reduced, and facilitating transportation of the security inspection device.

In the present embodiment, the height of the entire security inspection device can be lowered by making the arm frame 1 be retracted in the height direction during transportation, which meets the transportation requirements; moreover, after the center of gravity of the security inspection device is lowered, the security inspection device is less likely to shake with the bumps of the road surface during transportation, and improving the security of transportation.

As shown in FIG. 3, the arm frame 1 can be retracted in the transport state of the security inspection device to a height that does not exceed the height of the first compartment 3 or a maximum restricted height for road travel. This kind of setting can minimize the size of the security inspection device along the height direction during transportation, so that the size of the security inspection device in the height direction depends on the height of the first compartment 3, and improving the stability of transportation and ensuring the security of road driving.

In one embodiment, a height of the protection wall 2 is set to be less than or equal to the height of the first compartment 3. This setting allows the height of the entire security inspection device to be approximately equal to the height of the first compartment 3 during transportation, and minimizing the height of the entire security inspection device and avoiding exceeding the height limit for vehicles during road transportation.

In some embodiments, the detector 11 includes a first detection part arranged on the horizontal arm 12 and a second detection part with a variable position relative to the horizontal arm 12. In the inspect state, the second detection part is arranged on one side of the inspection channel A, and in the transport state, the second detection part is arranged on the horizontal arm 12. The setting facilitates the detector 11 to adapt to the inspect state and the transport state, and can prevent the detector 11 from affecting the switching of the radiation inspection equipment in the inspect state and the transport state without affecting the function of the detector 11.

For example, in the inspect state, the second detection part can be vertically arranged on one side of the inspection channel A, or can have an included angle with the vertical direction; in the transport state, the second detection part and the first detection part for example can be arranged on the horizontal arm 12 along the extension direction of the horizontal arm 12 side by side along the horizontal direction or side by side along the vertical direction.

In some embodiments, the second detection part may be hinged with the first detection part, and the second detection part changes its position relative to the horizontal arm 12 by rotating around the first detection part. In some other embodiments, the second detection part may be hinged with the arm frame 1, and the second detection part changes its position relative to the horizontal arm 12 by rotating around the arm frame 1. For example, the second detection part may be hinged with the horizontal arm 12 or hinged with the vertical arm 13. The second detection part is hinged on the first detection part or the arm frame 1, to facilitate rapid and accurate positioning of the detector 11 when the radiation inspection equipment is switched rapidly between the inspect state and the transport state, and shortening the switching time of the radiation inspection equipment, and facilitating that the detector 11 is in an accurate detection position when the radiation inspection equipment is in the inspect state.

The connection relationship between the second detection part and the first detection part or the arm frame 1 is not limited to hinged connection, for example, in the inspect state and the transport state, the second detection part can also be removably connected in the corresponding position.

In some embodiments, the arm frame 1 is adjustable in length in the extension direction of the inspection channel A, i.e., the horizontal arm 12 is designed to be of a retractable form to achieve adjustable length. During transfer, the arm frame 1 is retracted in the direction vertical to the extension direction of the inspection channel A, and the first compartment 3 and the second compartment 3' are close to each other, and further reducing the volume of the security inspection device and reducing the requirement for the length of the transport vehicle.

As shown in FIG. 1, the security inspection device of the present disclosure may also include a second compartment 3', the arm frame 1 is of a portal structure and includes a horizontal arm 12 and two vertical arms 13 connected on both sides of the horizontal arm 12 respectively, and the first compartment 3 and the second compartment 3' are connected to the two vertical arms 13 respectively. This setting can make the whole structure have better symmetry and more reasonable structure arrangement.

The second compartment 3' may be of the same specification as the first compartment 3, and ensuring an aesthetic appearance of the entire security inspection device. In one embodiment, the second compartment 3' can also be selected with different specifications from the first compartment 3. In one embodiment, the size of the second compartment 3' is smaller than the size of the first compartment 3, to reduce the weight of the entire security inspection device.

The first compartment 3 and the second compartment 3' can adopt a closed structure with an outer cover, which is conducive to protecting the internal structure and also prevents sand and dust from entering the parts inside the compartment and has a more beautiful appearance; and the first compartment 3 and the second compartment 3' can also adopt an arm frame type structure to reduce the overall weight.

In some embodiments, the first compartment 3 is configured to be fixedly set relative to the ground in the working state of the security inspection device, or the entire security inspection device is fixedly arranged relative to the ground. In the working state, the security inspection device remains motionless and the inspected object moves relative to the security inspection device to complete the scanning inspection. Such a setting can simplify the structure of the security inspection device and does not require the installation of a walking device on the first compartment 3, which is also more convenient and more effective for the transportation and installation of the security inspection device.

In combination with FIG. 3 and FIG. 4, in an idle case, if the tire assembly is not considered, the security inspection device forms a rectangular body as a whole after the protection wall 2 and the arm frame 1 are closed, and greatly reducing the size along the extension direction of the inspection channel A, reducing the space occupied in the width direction of the transport equipment, facilitating transportation, and improving the stability during transportation. The security inspection device can be simply switched between the transport state and the working state, requires no installation and commissioning on site, has a self-protection function, and can transport the key parts as a whole without civil construction.

Secondly, the present disclosure further provides a transfer method based on the security inspection device of the above embodiments, in some embodiments, the transfer method includes:

in a state when the arm frame 1 is connected with the first compartment 3 and the protection wall 2 is connected with the first compartment 3 or the arm frame 1, and when the tire assembly is not removed, transporting the arm frame 1, the first compartment 3, the protection wall 2 and the tire assembly together to achieve transfer.

In some embodiments, the transfer method includes:

rotating the tire assembly to the outer part of the first compartment 3 in the horizontal plane vertical to the extension direction of the inspection channel A before transporting.

In some embodiments, the transfer method further includes:

retracting the protection wall 2 to shorten the length of the protection wall 2 in the extension direction of the inspection channel A before transporting.

In some embodiments, the transfer method further includes:

lowering the arm frame 1 to a height not exceeding the height of the first compartment 3 or the maximum restricted height for road travel before transporting.

In each of the above embodiments, the order of steps for removing the tire 4, retracting the protection wall 2 and lowering the height of the arm frame 1 can be interchanged, and the order of execution of each step can be determined according to the difficulty level of operation.

The structure and transfer method of the security inspection device in the present disclosure will be illustrated below with the security inspection device of FIGS. 1 to 4 as an example.

As shown in FIG. 1, the security inspection device includes an arm frame 1, a first compartment 3, a protection wall 2, a second compartment 3' and a tire assembly. The arm frame 1 includes a horizontal arm 12 and two vertical arms 13, and an inspection channel A is formed between the two vertical arms 13. The first compartment 3 and the second compartment 3' are connected to the vertical arms 13 on both sides of the arm frame 1, and the arm frame 1 is set between the front side and the rear side of the first compartment 3 and the second compartment 3' in the extension direction of the inspection channel A. The protection walls 2 on the left and right sides are connected to the first compartment 3 and the second compartment 3', respectively.

The first compartment 3 and the second compartment 3' are arranged at the same time, and the arm frame 1 is installed on the first compartment 2 and the second compartment 3', so that the cooperation relationship between various parts of the security inspection device is more stable, and being conducive to reducing the on-site commissioning work of the radiation inspection equipment after the transfer, but also being conducive to the overall stability of the radiation inspection equipment in various states, moreover, each part of the radiation detection equipment is arranged more flexibly.

A accommodating groove 6 is respectively arranged in the outer side of the first compartment 3 and the second compartment 3' in the horizontal plane in the direction vertical to the extension direction of the inspection channel A, the accommodating groove 6 can be set in a penetrating manner in the extension direction of the inspection channel A. In the accommodating groove 6 of each compartment, a bracket 5 is installed respectively at each end of the accommodating groove 6 along the extension direction of the inspection channel A, and each bracket 5 is installed with a tire 4 correspondingly. In FIG. 1, the security inspection device is in a working condition, at this time, the axis of the tire 4 itself is vertical to the extension direction of the inspection channel A, and the arm frame 1 is in a raised state.

As shown in FIG. 2, four protection walls 2 are respectively arranged on two sides of the first compartment 3 and the second compartment 3' along the extension direction of the inspection channel A. The protection walls 2 arranged on both sides of the first compartment 3 along the extension direction of the inspection channel A have a preset distance between them, so that the rays emitted by the radiation source can be smoothly irradiated onto the to-be-inspected object. The protection walls 2 arranged on both sides of the second compartment 3' along the extension direction of the inspection channel A may also have a preset distance between them, to protect this distance through the second compartment 3; or they may also be interconnected to form a continuous protection wall for better protection. The security inspection device in FIG. 2 is in working state and the protection wall 2 is in unfolded state.

As shown in FIG. 3, the security inspection device is in a transport state, the tire assembly is rotated as a whole to a point at which the axis of the tire 4 is consistent to the extension direction of the inspection channel A, at this time, in the horizontal plane vertical to the extension direction of the inspection channel A, the tire 4 may go beyond the outer side of the first compartment 3 and the second compartment 3'. Then the arm frame 1 is lowered to a height not exceeding that of the first compartment 3 and the second compartment 3', so that the height of the entire security inspection device is approximately equal to that of the first compartment 3 and the second compartment 3', while the protection wall 2 is folded inwards towards the midline of the inspection channel A.

As shown in FIG. 4, the security inspection device is in the transport state, and the folded protection wall 2 is arranged between the front side and rear side of the first compartment 3 and the second compartment 3', so that the width of the entire security inspection device in the front and rear directions is approximately equal to the width of the first compartment 3 and the second compartment 3'.

Before transportation, the tire assembly as a whole is rotated to a position at which the axis of the tire 4 is consistent with the extension direction of the inspection channel A; the arm frame 1 is lowered below the height of the first compartment 3 and the second compartment 3', so that the height of the entire security inspection device is approximately equal to the height of the first compartment 3 and the second compartment 3'; at the same time, the four protection walls 2 are folded inwards towards the midline of the inspection channel A, and after folding, the four protection walls 2 are all arranged between the front and rear sides of the first compartment 3 and the second compartment 3', so that the width of the entire security inspection device is approximately equal to the width of the first compartment 3 and the second compartment 3'.

After landing of the arm frame 1 and folding of the protection wall 2, the security inspection device is subjected to transfer transportation with the arm frame 1, the first compartment 3, the protection wall 2, the second compartment 3' and each tire assembly all in a connected state.

After arriving at the inspection site, the security inspection device is unloaded from the transport equipment, the arm frame 1, the first compartment 3, the protection wall 2, the second compartment 3' and the tire assembly remain connected, no reinstallation and commissioning are required on site, no temporary construction of a protection wall and civil construction work on the protection wall are required, and the security inspection device can be put into a working state.

As shown in FIG. 1 and FIG. 2, the tire assembly is arranged at the bottom of the radiation detection device for the inspection equipment to travel along the extension direction of the inspection channel A. As shown in FIG. 3 and FIG. 4, the tire assembly is configured to rotate by 90° in place to allow the inspection equipment to travel in a direction vertical to the extension direction of the inspection channel A.

As to this kind of security inspection device, after completing the scanning inspection of a row of multiple inspected objects (such as the first row of vehicles), the tire assembly compartment rotates outwards and rotates by 90°, and after rotating into place, the scanning equipment as a whole moves in the direction vertical to the extension direction of the inspection channel A in the horizontal plane (also called a transverse direction, the extension direction of the inspection channel A as a longitudinal direction). When the inspection equipment automatically moves laterally to another row of multiple inspected objects (such as the second row of vehicles), and then rotates the tire assembly by 90°, and then another row of multiple inspected objects are subjected to scanning inspection. The aforementioned steps are sequentially performed to achieve continuous scanning inspection of multiple rows of inspected objects, to improve the use efficiency of the security inspection device.

What is claimed is:

1. A security inspection device, comprising:
    an arm frame, provided with a plurality of detectors, and configured to form an inspection channel;
    a first compartment, internally provided with a radiation source and connected with the arm frame;
    a protection wall, connected with the first compartment or the arm frame, and configured to perform radiation protection for an object to be protected; and
    a tire assembly, configured to enable the security inspection device to move on the ground;
    wherein the arm frame, the first compartment, the protection wall and the tire assembly are configured to be transported together in a connected state;
    wherein the protection wall is arranged retractably relative to the arm frame, and is unfolded in a working state of the security inspection device to perform radiation protection on the object to be protected, and be retracted in a transport state of the security inspection device to shorten a length of the protection wall in an extension direction of the inspection channel.

2. The security inspection device according to claim 1, wherein the tire assembly is rotatably arranged around a vertical axis.

3. The security inspection device according to claim 1, wherein in an extension direction of the inspection channel, the tire assembly goes beyond an outer side of the first compartment in a working state of the security inspection device.

4. The security inspection device according to claim 3, wherein the tire assembly is configured to rotate to an outer side of the first compartment in a horizontal plane vertical to the extension direction of the inspection channel in a transport state of the security inspection device.

5. The security inspection device according to claim 1, wherein the tire assembly comprises:
a bracket, rotatably arranged at the bottom of the first compartment; and
a tire, mounted on the bracket;
wherein the tire assembly is configured to rotate to a location at which an axis of the tire is vertical to an extension direction of the inspection channel in a working state of the security inspection device, and is configured to rotate to a location at which the axis of the tire is consistent with the extension direction of the inspection channel in a transport state of the security inspection device.

6. The security inspection device according to claim 2, wherein an outer side of the bottom of the first compartment is provided with an accommodating groove, the tire assembly is arranged in the accommodating groove, and the axis of rotation is set to be close to an inner side of the accommodating groove in a horizontal plane vertical to an extension direction of the inspection channel, and the tire assembly is configured to rotate outwards in the horizontal plane vertical to the extension direction of the inspection channel in a transport state of the security inspection device.

7. The security inspection device according to claim 2, further comprising a controller and a drive member, wherein the controller is configured to enable the drive member to drive the tire assembly to rotate.

8. The security inspection device according to claim 1, wherein in an extension direction of the inspection channel, a relative position between the arm frame and the first compartment remains unchanged in a transport state and a working state of the security inspection device.

9. The security inspection device according to claim 1, wherein in the extension direction of the inspection channel, the protection wall does not go beyond a side of the first compartment in a retracted state.

10. The security inspection device according to claim 1, wherein the protection wall is rotatably arranged in a horizontal plane is retracted inwards in the transport state of the security inspection device.

11. The security inspection device according to claim 10, wherein the security inspection device comprises two groups of protection walls, two groups of a protection walls are respectively arranged on two sides of the arm frame along the extension direction of the inspection channel, each group of protection walls comprises two protection walls arranged in parallel, which are configured to be folded towards a midline of the inspection channel to achieve retraction.

12. The security inspection device according to claim 1, wherein in an extension direction of the inspection channel, a height of the protection wall gradually decreases in a direction away from the arm frame.

13. The security inspection device according to claim 1, wherein the arm frame is set in a liftable manner in a height direction, and is configured to be raised in a working state of the security inspection device to form the inspection channel, and is configured to be lowered in a transport state of the security inspection device for retraction thereof.

14. The security inspection device according to claim 13, wherein the arm frame is configured to be retracted in the transport state of the security inspection device to a height not exceeding the height of the first compartment or a maximum restricted height for road travel.

15. The security inspection device according to claim 1, further comprising a second compartment, wherein the arm frame is of a portal structure and comprises a horizontal arm and two vertical arms, the top ends of the two vertical arms are respectively connected with two ends of the horizontal arm respectively, and the bottom ends of the two vertical arms are respectively connected with the first compartment and the second compartment.

16. The security inspection device according to claim 1, wherein the arm frame is adjustable in length in a horizontal plane in a direction vertical to an extension direction of the inspection channel.

17. A transfer method of the security inspection device according to claim 1, comprising:
in a state when the arm frame is connected with the first compartment and the protection wall is connected with the first compartment or the arm frame, and the tire assembly is not removed, transporting the arm frame, the first compartment, the protection wall and the tire assembly together to achieve transfer thereof.

18. The transfer method according to claim 17, further comprising:
rotating the tire assembly to an outer side of the first compartment in a horizontal plane vertical to an extension direction of the inspection channel before transporting.

19. The transfer method according to claim 17, further comprising at least one of the following steps:
retracting the protection wall to shorten a length of the protection wall in an extension direction of the inspection channel before transporting; and
lowering the arm frame to a height not exceeding the height of the first compartment or a maximum restricted height for road travel before transporting.

* * * * *